(No Model.)
J. P. B. FISKE.
DEVICE FOR AUTOMATICALLY OPERATING BRAKES AND RHEOSTATS.
No. 543,524.  Patented July 30, 1895.
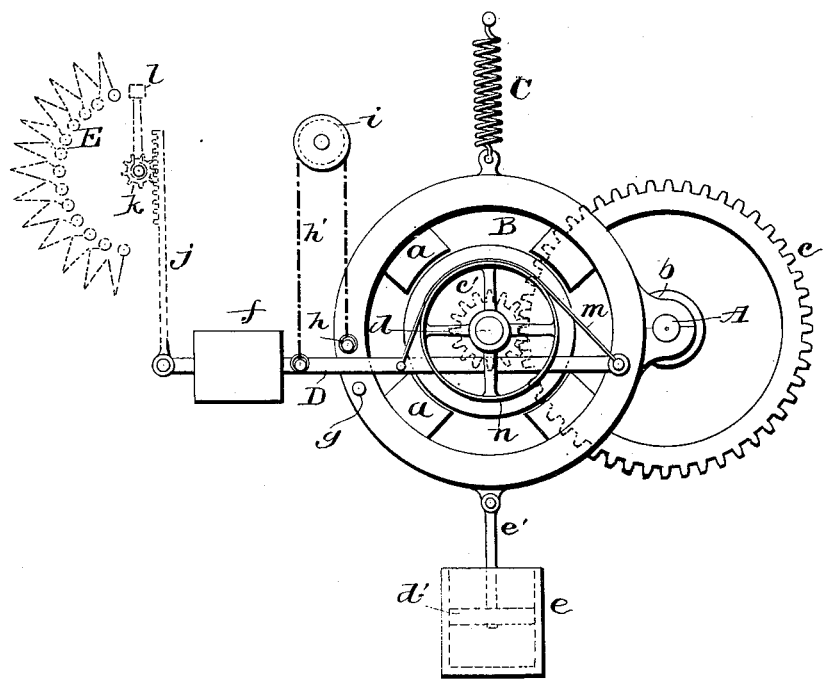
Witnesses
E. J. Nottingham
G. F. Downing
Inventor
J. P. B. Fiske
By H. A. Seymour
Attorney

UNITED STATES PATENT OFFICE.

JONATHAN P. B. FISKE, OF ALLIANCE, OHIO.

DEVICE FOR AUTOMATICALLY OPERATING BRAKES AND RHEOSTATS.

SPECIFICATION forming part of Letters Patent No. 543,524, dated July 30, 1895.

Application filed December 6, 1894. Serial No. 531,046. (No model.)

*To all whom it may concern:*

Be it known that I, JONATHAN P. B. FISKE, a resident of Alliance, in the county of Stark and State of Ohio, have invented certain new and useful Improvements in Devices for Automatically Operating Brakes and Rheostats; and I do hereby declare the following to be a full, clear, and exact description of the invention, such as will enable others skilled in the art to which it appertains to make and use the same.

My invention relates to improved devices for automatically operating a brake and rheostat, the object of the invention being to produce simple and efficient means whereby to automatically operate a motor-brake and rheostat by or through the medium of the action of the motor in conjunction with the load put upon it.

A further object is to so construct and mount an electric motor that its movement as a whole will be utilized in the operation of a brake and a rheostat.

With these objects in view the invention consists in the combination, with a pivotally-supported motor, of a brake connected therewith and operated by the movements thereof.

The invention also consists in the combination, with a motor having a lateral pivotal support, of a brake connected with said motor and operated by the movements thereof.

The invention also consists in the combination, with a motor having a lateral pivotal support and yielding devices constructed and adapted to sustain the motor in a normal position when not running, of a brake connected with said motor and operated by the movements thereof.

The invention also consists in the combination, with a pivotally-supported electric motor, of a brake and a rheostat connected therewith and operated thereby.

The invention also consists in the combination, with a shaft or axle and a motor having a lateral pivotal connection with said shaft or axle, of gearing connecting said shaft or axle and motor and a brake connected with said motor, the operation of the brake depending upon the movements of the motor as controlled by the load on the motor; and the invention also consists in certain novel features of construction and combinations and arrangements of parts, as hereinafter set forth, and pointed out in the claims.

The accompanying drawing illustrates an embodiment of my invention.

A represents a shaft or axle for conveying the power of a motor to the machine or apparatus to be driven, and on this shaft or axle the frame or field-magnets $a$ of an electric motor B are pivotally supported, said frame having an ear (or ears) $b$ at one side for that purpose. A gear-wheel $c$ is secured to the shaft or axle A and receives motion from a pinion $c'$ secured to the armature-shaft $d$ of the motor. The motor is sustained in its normal position relatively to the shaft or axle by means of a spring C secured at one end to the motor-frame and at the other end to any suitable fixed object independent of said frame, the capacity of said spring being sufficient to counterbalance the weight of the motor, and yet permit a movement thereof, when the motor is running, in a manner and for a purpose hereinafter explained, and this movement of the motor will be cushioned and its abruptness checked by means of a dash-pot $e$, the piston $d'$ of which is connected with the lower portion of the motor-frame by a link or piston-rod $e'$, the connection of the link or piston-rod with the frame being, of course, a pivotal one.

A lever D is pivotally connected at one end to the motor or field-magnet frame $a$, preferably at a point in proximity to the connection of the latter with the shaft or axle A, or said lever might be pivoted to some object independent of the motor-frame. From its pivotal connection the lever D projects across the end of the motor and laterally beyond the same, and its free end is provided with a weight $f$. The lever D projects between two pins $g$ $h$, projecting from the motor-frame. One end of a chain $h'$ or other flexible device is connected with the pin $h$, and said chain, after passing over a pulley $i$, (supported by a device independent of the motor,) is secured at its other end to the lever D. A rack-bar $j$ is connected with the free end of the lever D and meshes with a pinion $k$, which carries a shoe $l$ of a starting-rheostat E, so that when said lever is moved the rheostat will be operated. The lever D constitutes also a brake-lever, a brake-band $m$ being secured at one end to the lever at the pivotal connection of the latter and at the other end to said lever between the ends of the latter, said brake-band being made to pass over and bear upon a brake-wheel $n$, secured to the armature-shaft of the motor.

When the motor is in operation and considerable load is placed on the shaft or axle A, more or less resistance will be offered by the gear-wheel $c$ to the pinion $c'$, and consequently said pinion will tend to ride on the gear-wheel and thus cause the motor to move down, which movement will be utilized to reduce the frictional contact of the brake-band with the brake-wheel and thereby permit a freer rotation of the armature, as will be presently more fully explained.

It will be seen that when the motor moves downwardly it will pull upon the chain $h'$, and the other end of said chain, after passing over the pulley $i$, being secured to the lever D, the latter will be raised and the brake-band released, so that when the load on the driven shaft A increases the brake-band will be loosened and the freer rotation of the armature-shaft permitted. It will be seen that when the lever D is thus made to rise the rheostat will be operated automatically and simultaneously with the brake device to throw more or less resistance into the circuit of the motor.

When the current is cut off from the motor and the torque ceases, the weight $f$, in falling, will centralize the field-magnet frame and will act to apply the brake. In a similar manner the rheostat will be operated by the lever through the medium of the devices above described. The dash-pot serves to cushion or check the too-rapid movement of the field-magnet frame, brake, and rheostat.

My improvements are very simple in construction and effectual in all respects in the performance of their functions.

I do not wish to limit myself to the precise details of construction herein set forth; but, Having fully described my invention, what I claim as new, and desire to secure by Letters Patent, is—

1. The combination with an electric motor constructed and adapted to move bodily in response to the increase or decrease of the amount of load put upon it, of starting and stopping devices connected with said motor and operated by said movements thereof, substantially as set forth.

2. The combination with a driven shaft, of an electric motor geared therewith and supported in such manner as to be capable of a movement bodily when the amount of the load on the driven shaft increases or decreases, and starting and stopping devices connected with said motor and operated by the said movements thereof, substantially as set forth.

3. The combination with a driven shaft, of a motor pivotally connected thereto, said motor being so geared to the shaft as to have a movement bodily relatively thereto when the load on the driven shaft increases or decreases, and starting and stopping devices connected with said motor and operated by the said movements thereof, substantially as set forth.

4. The combination with a driven shaft and a gear wheel secured thereto, of a motor pivotally connected with the shaft, a pinion on the driving member of said motor meshing with said gear wheel so that when the load on the driven shaft increases the pinion will tend to ride on the periphery of the gear wheel, and starting and stopping devices connected with said motor and operated by the movements thereof, substantially as set forth.

5. The combination with a driven shaft and a gear wheel secured thereto, of an electric motor pivotally connected to the shaft, a pinion carried by the armature of said electric motor and meshing with said gear wheel so that when the load on the driven shaft increases or decreases the pinion will tend to ride on the periphery of the gear wheel, whereby to cause the motor to have a movement on its pivotal connection with the shaft, and a brake and a rheostat connected with said motor so as to be operated by the said movements thereof, substantially as set forth.

6. The combination with a driven shaft, of a motor geared therewith and so mounted as to have a movement bodily in two directions in accordance with the increase or decrease of the load on the driven shaft and a brake and a rheostat connected with said motor and operated by the said movements thereof, substantially as set forth.

7. The combination with a driven shaft and a motor pivotally connected thereto, of a spring for counterbalancing the weight of said motor, gearing between said motor and shaft, and a brake connected with the motor and operated by the movements thereof on its pivotal connection with the driven shaft, substantially as set forth.

8. The combination with a driven shaft, a gear wheel thereon and an electric motor pivotally connected with said shaft, of a pinion on the armature shaft meshing with said gear wheel, a brake wheel carried by said armature shaft, and a friction device bearing on said brake wheel and connected with the motor in such manner that when the motor moves on its pivotal connection with the driven shaft, said friction device will be operated relatively to the brake wheel, substantially as set forth.

9. The combination with a driven shaft, and an electric motor pivotally connected thereto and geared therewith, of a brake wheel carried by the armature shaft, a pivoted lever, a brake band connected with the pivoted lever and bearing on the brake wheel, and devices carried by the motor whereby to operate said lever when the motor moves on its pivotal connection with the driven shaft, substantially as set forth.

10. The combination with a driven shaft, a motor pivotally connected at one side thereto and gearing between said shaft and motor, a spring for counterbalancing said motor, a dash pot to cushion the movement of the motor on its pivotal connection with the driven shaft, a brake wheel carried by the driving part of the motor, a pivoted lever, a brake band connected with said lever and bearing on said brake wheel, and devices connected with the motor for operating said lever to operate the brake when the motor moves on its pivotal connection with the driven shaft, substantially as set forth.

11. The combination with a driven shaft, of a motor having a lateral pivotal connection with said driven shaft, gearing between said motor and shaft, a brake wheel on the motor shaft, a pivoted lever, a weight on said lever, a brake band connected with said lever and bearing on said brake wheel, a pulley, and a flexible device passing over said pulley and connected at its ends to the motor and lever respectively so that when the motor moves downwardly the lever will be raised, substantially as and for the purpose set forth.

12. The combination with a driven shaft, an electric motor pivotally connected thereto and gearing between said motor and shaft, of a brake wheel on the armature shaft, a pivoted lever, a brake band connected with said lever and bearing on the brake wheel, devices connected with the motor for causing said lever to move to release the brake when the motor moves on its connection with the driven shaft, a rheostat, a pinion carried by the contact brush of said rheostat, and a rack bar meshing with said pinion and connected with said pivoted lever, substantially as set forth.

In testimony whereof I have signed this specification in the presence of two subscribing witnesses.

JONATHAN P. B. FISKE.

Witnesses:
CHAS. P. SMITH,
H. W. HARRIS.